(12) United States Patent
Chen et al.

(10) Patent No.: US 11,544,378 B2
(45) Date of Patent: Jan. 3, 2023

(54) TEE ACCESS CONTROL METHOD AND MOBILE TERMINAL IMPLEMENTING SAME

(71) Applicant: CHINA UNIONPAY CO., LTD., Shanghai (CN)

(72) Inventors: Chengqian Chen, Shanghai (CN); Yu Zhou, Shanghai (CN); Wei Guo, Shanghai (CN)

(73) Assignee: CHINA UNIONPAY CO., LTD., Shanghai (CN)

(*) Notice: Subject to any disclaimer, the term of this patent is extended or adjusted under 35 U.S.C. 154(b) by 1036 days.

(21) Appl. No.: 16/088,929

(22) PCT Filed: Mar. 28, 2017

(86) PCT No.: PCT/CN2017/078347
§ 371 (c)(1),
(2) Date: Sep. 27, 2018

(87) PCT Pub. No.: WO2017/167166
PCT Pub. Date: Oct. 5, 2017

(65) Prior Publication Data
US 2019/0318087 A1 Oct. 17, 2019

(30) Foreign Application Priority Data

Apr. 1, 2016 (CN) .......................... 201610198543.8

(51) Int. Cl.
*G06F 21/56* (2013.01)
*G06F 21/31* (2013.01)

(52) U.S. Cl.
CPC ............ *G06F 21/562* (2013.01); *G06F 21/31* (2013.01); *G06F 2221/033* (2013.01); *G06F 2221/2149* (2013.01)

(58) Field of Classification Search
CPC ................................ G06F 21/562; G06F 21/31
(Continued)

(56) References Cited

U.S. PATENT DOCUMENTS 8,291,495 B1 * 10/2012 Burns .................. H04L 63/168
726/23
2002/0120749 A1 * 8/2002 Widegren ........... H04L 12/1439
(Continued)

FOREIGN PATENT DOCUMENTS

CN       105138904 A    12/2015
EP        2746981 A1 *  6/2014  ............. G06F 21/53

OTHER PUBLICATIONS

Almenárez, Florina et al. "Trust Management for Multimedia P2P Applications in Autonomic Networking." Ad hoc networks 9.4 (2011): 687-697. Web. (Year: 2011).*

*Primary Examiner* — Samson B Lemma
(74) *Attorney, Agent, or Firm* — The Ollila Law Group LLC

(57) ABSTRACT

The present invention relates to a method for access control of a multimedia system to a secure operating system and a mobile terminal for implementing the method. The method includes the steps of: initiating an application access request for selecting a trusted application from a client application of a multimedia system to a secure operating system; making a decision as to whether the client application is a malicious application, and if not, proceeding to a next step, if yes, returning Selection Failure to the client application and performing an interrupt handling; sending the application access request from the multimedia system to the secure system; and acquiring, at the secure operating system, the trusted application based on the application access request and returning the trusted application to the multimedia system. The malicious accesses initiated by a malicious application to a trusted application in a securing operating
(Continued)

system can be prevented without switching between systems, and the problem that a trusted application cannot be accessed due to malicious access can be avoided.

4 Claims, 1 Drawing Sheet

(58) Field of Classification Search
USPC .......................................................... 726/17
See application file for complete search history.

(56) References Cited

U.S. PATENT DOCUMENTS

| | | | |
|---|---|---|---|
| 2004/0223602 A1* | 11/2004 | Honkasalo | H04W 12/08 |
| 2007/0174921 A1* | 7/2007 | England | G06F 21/53 |
| | | | 726/30 |
| 2013/0007838 A1* | 1/2013 | Baumhof | G06F 21/606 |
| | | | 726/1 |
| 2014/0075496 A1* | 3/2014 | Prakash | G06F 21/64 |
| | | | 726/1 |
| 2014/0317686 A1* | 10/2014 | Vetillard | G06F 21/606 |
| | | | 726/2 |
| 2016/0070932 A1* | 3/2016 | Zimmer | G06F 21/575 |
| | | | 713/192 |
| 2016/0098560 A1* | 4/2016 | Friedrichs | G06F 16/13 |
| | | | 726/23 |

* cited by examiner

TEE ACCESS CONTROL METHOD AND MOBILE TERMINAL IMPLEMENTING SAME

TECHNICAL FIELD

The present invention relates to a computer technology, and in particular to a method for access control for accessing a secure operating system from a multimedia operating system in a mobile terminal and a mobile terminal for implementing the method of access control.

BACKGROUND ART

With the increasingly extensive development of applications of computers and networks and the increasingly enrichment of categories of traffic in different fields, apparatus for security information interactions, i.e., information interactions that have higher requirements on security, e.g., a transaction processing procedure in the financial field, particularly apparatus for secure information interactions based on mobile terminals, become increasingly important.

In traditional technical solutions, for improving the security of an apparatus for information interaction, the concept of trusted execution environment (TEE) has been proposed. Owing to the emergence of TEE, more and more external secure carriers would be under control of TEE due to security considerations, managing these external secure carriers by TEE, thus greatly improving securities of these external secure carriers, ensuring that an external secure carrier used by a user is the correct external secure carrier, and the operation of the user with the external secure carrier will not be tempered by other malicious third parties.

TEE is a secure operating system that is co-located with a multimedia operating system (in the following description of the specification, an Android system is taken as an example) on a smart terminal, various trusted applications run thereon may provide various reliable secure services for Android applications. As for how a TEE trusted application may control access to its secure services, that is, a TEE trusted application may allow which Android applications to access its secure services, one of currently employed technical approaches is one access mechanism based on username/password, that is, when each of Android applications selects a specific TEE trusted application, a username and password is appended therewith at the same time, and TEE forwards, based on a trusted application identification, the select command to the selected trusted application, which then makes a decision on the username and password, and if it is decided to be valid, Success is returned to TEE, which then generates a valid credential, by which, subsequent Android applications may access secure services of the trusted applications; if it is decided to be invalid, Failure is returned to TEE, which will not generate a credential and will return to the Android application a notification that the trusted application selection fails.

However, the approach has had following disadvantages that:

When an Android application uses the mechanism to make malicious access to TEE trusted applications continuously, since it is required that TEE decides whether each selection is valid or not, this will cause a terminal to switch to TEE continuously to run, thus resulting in continuous switching of the terminal between Android and TEE, which easily leads to a jitter phenomenon of the system, resulting in slower response of an Android system. Meanwhile, when continuous and malicious selections and accesses are initiated to TEE applications, a TEE trusted application is easily caused to be in a state where decisions on user access rights are made at all times, and thereby normal access requests from legal applications cannot be responded.

BRIEF SUMMARY OF THE INVENTION

In view of the above problems, the present invention is to provide a method for TEE access control and a mobile terminal for implementing the method for TEE access control, the method for TEE access control can effectively avoid the problem that the TEE trusted application cannot be accessed due to malicious accesses, and can improve overall availability and reliability of the TEE system.

A method of the present invention for access control of a multimedia system to a secure system is characterized by comprising: a secure service request step for initiating an application access request for selecting a trusted application from a client application of a multimedia system to a secure operating system; an access right decision step for making a decision as to whether the client application that initiates an invocation is a malicious application, and if not, the method proceeds to an application request sending step, and if yes, the method returns Selection Failure to the client application and performing an interrupt handling; the application request sending step for sending the application access request from the multimedia system to the secure operating system; and an application acquiring step for acquiring a trusted application based on the application access request at the secure operating system, and returning the trusted application to the multimedia system.

Preferably, the access right decision step includes the sub-steps of: acquiring an application identification of the client application that initiates the invocation; deciding whether the client application is a malicious application based on the application identification; and if not, proceeding to an application request sending step, and if yes, it returns Selection Failure to the client application and performing the interrupt handling.

Preferably, in the step of deciding whether the client application is a malicious application based on the application identification, a malicious application registry stored in the multimedia system is queried, and it is decided whether the client application is a malicious application based on the application identification, wherein the malicious application registry stores at least application identifications of malicious applications.

Preferably, the application acquiring step includes the sub-steps of: selecting a respective trusted application based on a trusted application identification in the application access request at a secure operating system, and sending the application access request to the respective trusted application; acquiring a username and a password from the application access request, and making a decision as to the validity of the username and the password; and returning the result of validity decision as the trusted application selection result to the multimedia system from the secure operating system.

Preferably, in the step of application acquiring step, the multimedia system acquires the trusted application selection result, deciding whether the client application is a malicious application based on a rule condition prestored therein, and if yes, the client application is registered into the malicious application registry.

According to another aspect of the present application, a mobile terminal is provided for implementing access control of a multimedia system to a secure operating system, the mobile terminal comprising a multimedia system and a secure operating system, the multimedia system comprises: a client application for initiating an application access request for selecting a trusted application to a secure operating system; an interaction module for providing the client application with an application access interface for accessing the secure operating system; a control access module for making a decision as to whether the client application that is currently accessing is a malicious application, and listening for a processing result of selecting the trusted application by the client application, and making a decision as to whether the access initiated by the client application is a malicious access based on prescribed rules; and a first communication module for implementing data transmission between the multimedia system and the secure operating system, the secure operating system includes: one or more trusted applications; a command distributing module for distributing an application access request from a multimedia operating system to a respective trusted application; a user access right management module, invoked by the trusted application, for making a decision as to the validity of the application access request; and a second communication module for implementing data transmission between the secure operating system and the multimedia system.

Preferably, the interaction module acquires an application identification of the client application from the application access request sent by the client application, and provides the application identification to the control access module.

Preferably, the control access module includes: a malicious application registry for storing at least application identifications of malicious applications; a rule file for storing at least prescribed rules for making a decision as to whether the client application is a malicious application; and a control processing module for making a decision as to whether the client application that is currently accessing, as provided form the interaction module, is a malicious application based on application identifications of the malicious applications stored in the malicious application registry, and listening for the processing result of selecting the trusted application by the client application, and making a decision as to whether the access initiated by the client application is a malicious access based on the prescribed rules stored in the rule file.

Preferably, the control processing module obtains the processing result of selecting a trusted application by the client application from the first communication module.

Preferably, the user access right management module makes a decision as to whether the username and the password contained in the application access request are correct based on the invocation of the trusted application.

As described above, the access control of the present invention can block any malicious access to a secure operating system from a multimedia system, utilize a control access module to acquire processing result of selecting a trusted application of a secure operating system by a higher level multimedia system, and when the control access module finds that the client application fails to select respective trusted applications many times, it is decided that the multimedia system is initiating a malicious access, identifies the client application of the multimedia system as a malicious application, and treats any of subsequent access requests initiated by the application of the multimedia system to the secure operating system as a malicious access. Therefore, when the client application being identified as a malicious application invokes again the interaction module to initiate an access to the secure operating system later, the interaction module will directly refuse the access made by the client application based on identification result of the control access module without switching to the secure operating system, thus avoiding various problems caused by the system switching performed by the terminal.

The method of the present invention for TEE access control may be used as a supplement to the existing TEE trusted application access control mechanisms, and is able to prevent any malicious application from initiating a malicious access to the TEE trusted application without switching between systems. The method further avoids the problem that the TEE trusted application cannot be accessed due to malicious accesses, and improves the overall availability and reliability of the TEE system.

DETAILED DESCRIPTION OF EMBODIMENTS

What is introduced below is some of a plurality of embodiments of the present invention, aiming to provide a basic understanding of the present invention. It is not intended to identify the key or deterministic element or define the claimed scope of the present invention.

Hereinafter, description is given to a method of the present invention for access control and a mobile terminal for implementing the method for access control. In the specification, an Android system that is taken as an example of the multimedia system and a TEE system that is taken as an example of the secure operating system will be described. Of course, the present invention is not limited to an Android system, and may apply to other multimedia operating system.

Figure 1:
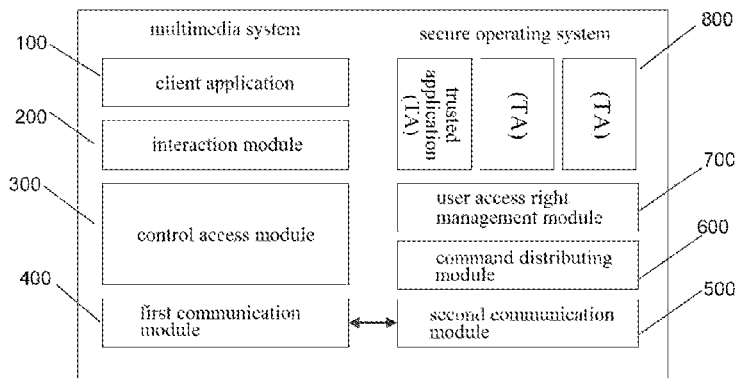
FIG. 1 is a block diagram of a mobile terminal according to one embodiment of the present invention.

FIG. 1 is a structural block diagram of a mobile terminal according to one embodiment of the present invention.

As shown in FIG. 1, a mobile terminal according to one embodiment of the present invention includes a multimedia operating system and a secure operating system.

Wherein a multimedia operating system (e.g., an Android system) includes a client application 100, an interaction module 200, a control access module 300 and a first communication module 400.

Wherein the client application 100 is located within the multimedia operating system, and initiates various secure access requests to the trusted application 800 in a secure operating system (e.g., a TEE system) by means of the interaction module 200.

The interaction module 200 provides a specific application access interface for accessing the trusted application of the secure operating system to the client application 100. The interaction module 200 acquires and forwards the identification of the client application to the control access module 300, which will make a decision as to whether it is a malicious application.

Figure 2:
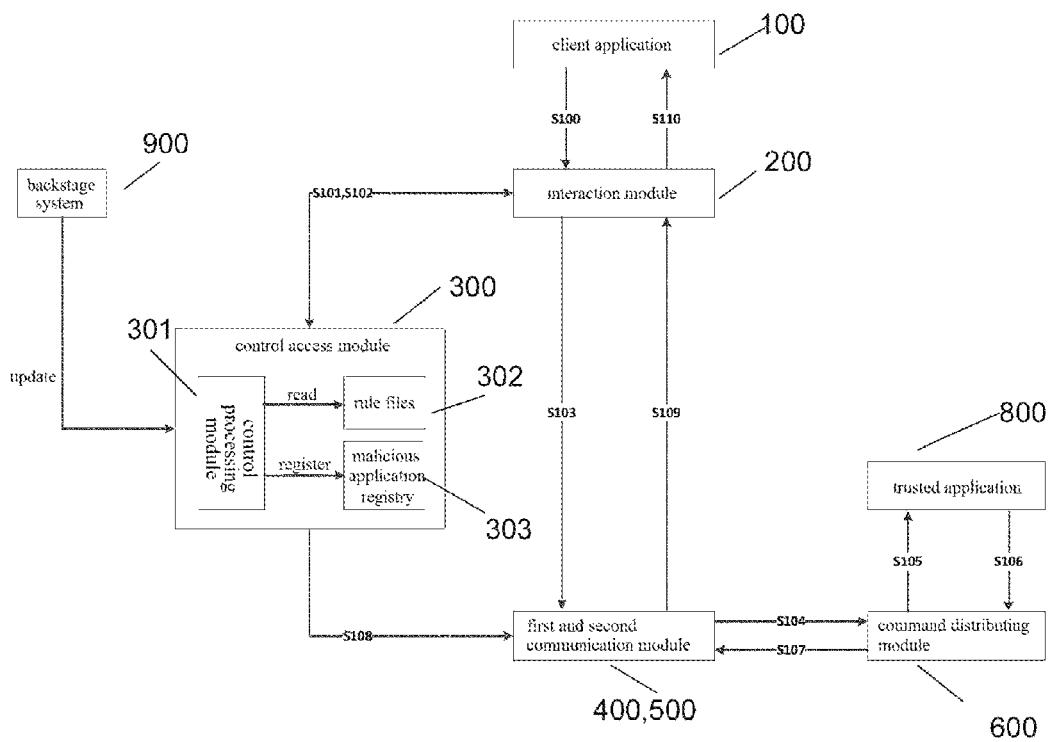
FIG. 2 is a flowchart of a method for access control according to one embodiment of the present invention.

The control access module 300 includes a control processing module 301, a rule file 302 and a malicious application registry 303 (as shown in FIG. 2). The control processing module 301 receives, on one hand, an identification of a client application from the interaction module 200, makes a decision as to whether the currently accessing client application is a malicious application by referring to identifications of malicious applications stored in the malicious application registry 303, and, on the other hand, the control processing module 301 listens for processing result of selecting the trusted application by the client application, and reads respective decision rules from the rule file 302, makes a decision as to whether the access initiated by the client application is a malicious access based on decision rules, and if yes, identifies the client application as a malicious application and stores it in the malicious application registry 303.

The first communication module 400 enables the system switching between the multimedia system and the secure operating system, and provides a data transmission channel of the client application 100 access request data into the trusted application of the secure operating system.

The secure operating system includes a second communication module 500, a command distributing module 600, a user access right management module 700 and a plurality trusted applications 800.

Wherein the second communication module 500 enables the system switching between the secure operating system and the multimedia system, and provides the data transmission channel of the trusted application of the secure operating system to the multimedia operating system.

The command distributing module 600 forwards the access request data to the trusted application 800 based on the trusted application identification in the request access data from the multimedia operating system.

The user access right module 700 is invoked by the trusted application 800, for making a decision as to whether the username and password in the common application access request is correct, to decide whether the access request sent from the common application is accepted for processing. The trusted application 800 is located within the secure operation system, which is an application that provides various secure services for common applications, there may be a plurality of the trusted applications 800.

Next, a method for access control according to one embodiment of the present invention implemented by utilizing the above-mentioned mobile terminal will particularly be explained.

FIG. 2 is a flowchart of a method for access control according to one embodiment of the present invention.

A specific flowchart of the method for access control according to the embodiment will be explained with reference to FIG. 2 below.

In step S100, when one client application 100 is to initiate a secure service access request to the trusted application 800, it first invokes the interaction module 200 to send a TEE trusted application selection command for selecting a specific trusted application, to which the secure service request is to be initiated.

In step S101, the interaction module 200 acquires the application identification (e.g., taking a hash value of the application, application package name as the application identification) of the client application 100 that initiates the invocation from API (Application Programming Interface) provided by the multimedia operating system layer, and sends the identification of the client application to the control access module 300, in order to decide whether the client application that currently initiates the invocation is a malicious application.

In step S102, the control access module 300 queries its stored malicious application registry, and makes a decision as to whether the application identification of the client application 100 is found in the malicious application registry based on the received application identification of the client application 100, and if yes, it is decided that the client application is a malicious application, or else, it is decided that the client application is not a malicious application, and the control access module 300 returns the decision result to the interaction module 200.

In step S103, the interaction module 200, based on the returned result from the control access module 300, returns Application Selection Failure directly to the current client application 100 if the returned result indicates that the current application is a malicious application; or the interaction module 200, in step S104, sends the selected application request data to the secure operating system via the first communication module 400 and the second communication module 500 if the returned result indicates that the current application is not a malicious application.

In step S105, the command distributing module 600 selects the corresponding trusted application based on the application identification of the trusted application in the selected application request data, and sends the request data to the corresponding trusted application for processing.

In step S106, the selected trusted application gets the username and password from the request data, and invokes the user access right management module 700 to make a decision on the validity of the username and password, the user access right management module 700 returns the decision result to the trusted application, which returns the decision result to the command distributing module 600.

In step S107, the command distributing module 600 returns the decision result to the multimedia operating system via the second communication module 500 and the first communication module 400, which then is returned to the interaction module 200 in step S109, and next sends upstream, and finally, in step S110, returned to the client application 100. Wherein in step S108, during each selection of the trusted application of the secure operating system, the control access module 300 acquires the trusted application selection result from the first communication module 400, and if the result indicates that the trusted application select fails, the control processing module 301 in the control access module 300 makes a decision as to whether the client application is a malicious application based on the condition description (e.g., the number of failures does not exceed three, etc.) being read from the rule file 302 stored in the control access module 300. In case that the condition description is med, the current client application is identified as a malicious application, and the control processing module 301 registers the user identification of the client application into the malicious application registry 302. On the other hand, the backstage system 900 (the backstage system 900 may be a third party arranged outside of the mobile terminal, or may be other application programs in the mobile terminal) is connected with the control access module 300, the backstage system 900 can update the rule file 302 and the malicious application registry 302 in the control access module 300. In the control access module 300 of the present invention, as described above, the rule file 302 has stored therein a condition for making decision as to whether it is a malicious application, and the malicious application registry 303 has stored therein at least the identification of a malicious application.

As described above, to prevent a client application of a multimedia operating system, such as an Android system, initiating frequently accesses to a secure operating system, such as a TEE system, the present invention is to provide a method for access control for controlling such a malicious access immediately in the multimedia operating system. Particularly, the focus of the subject matter of the present invention is that a control access module 300 is added in the Android system, the control access module 300 acquires processing result of selecting a TEE trusted application by a higher level Android application, and when it is found that the Android application fails to Android applications many times, it is decided that the Android is initiating a malicious access, the Android application is identified as a malicious application, and any of subsequent access requests initiated by the Android application to the TEE is treated as a malicious access. Therefore, when the Android application being identified as a malicious application invokes again the interaction module 200 to initiate an access to the TEE trusted application later, the interaction module 200 will directly refuse the access made by the Android application based on identification result of the control access module 300 without switching to the TEE system, avoiding various problems caused by the system switching performed by the terminal, as referred to while describing above problems.

The method of the present invention for access control may be used as a supplement to existing TEE trusted application access control mechanisms, be able to prevent any malicious application from initiating a malicious access to the TEE trusted application without switching between systems, further avoid the problem that the TEE trusted application cannot be accessed due to the malicious accesses, and improve the overall availability and reliability of the TEE system.

The forgoing examples mainly explain a method of the present invention for access control and a mobile terminal for implementing the method for access control. Although some of specific embodiments of the present invention have been described, it should be understood by persons skilled in the art that the present invention may be practiced in many other forms without departing from the spirit and scope thereof. Therefore, the depicted examples and embodiments should be considered as exemplary and not restrictive, the present invention may cover various modifications and substitutions without departing from the spirit and scope of the present invention as defined in the appended claims.

What is claimed is:

1. A method for access control of a multimedia system to a secure operation system, comprising:
   at the multimedia system, initiating an application access request for selecting a trusted application from a client application of a multimedia system to a secure operating system;
   at the multimedia system, making a decision as to whether the client application that initiates an invocation is a malicious application, and if yes, returning Selection Failure to the client application and performing an interrupt handling, and if not, the method further comprising:
   at the multimedia system, sending the application access request from the multimedia system to the secure operating system; and
   at the secure system, acquiring a trusted application and returning the trusted application to the multimedia system based on the application access request;
   wherein the step of deciding whether the client application is a malicious application based on the application identification comprising: querying a malicious application registry stored in the multimedia system, and deciding whether the client application is a malicious application based on the application identification,
   wherein the malicious application registry stores at least application identifications of the malicious applications; and
   wherein the step of acquiring the trusted application comprises the sub-steps of:
   selecting a respective trusted application based on a trusted application identification in the application access request at a secure operating system, and sending the application access request to the respective trusted application;
   acquiring a username and a password from the application access request, and making a decision as to the validity of the username and the password; and
   returning the result of validity decision as the trusted application selection result to the multimedia system from the secure operating system.

2. The method according to claim 1, wherein the step of making the decision comprises the sub-steps of:
   acquiring an application identification of the client application that initiates the invocation;
   deciding whether the client application is a malicious application based on the application identification; and
   if not, proceeding to the application request sending step, and if yes, returning Selection Failure to the client application and performing the interrupt handling.

3. The method according to claim 1, wherein the step of acquiring the trusted application further comprise: at the multimedia system, acquiring the trusted application selection result, deciding whether the client application is a malicious application based on a rule condition prestored therein, and if yes, registering the client application in the malicious application registry.

4. The method according to claim 3, wherein the rule condition is set as: the times that the client application fails to acquire the trusted applications exceeds a prescribed number.

* * * * *